United States Patent [19]

Fujimori et al.

[11] 4,418,373
[45] Nov. 29, 1983

[54] TAPE CASSETTE

[75] Inventors: Tohru Fujimori, Tokyo; Yoshino Kusui, Kawasaki, both of Japan

[73] Assignee: Sony Corporation, Tokyo, Japan

[21] Appl. No.: 457,903

[22] Filed: Jan. 14, 1983

[30] Foreign Application Priority Data

Jan. 25, 1982 [JP] Japan ................................. 57-9659

[51] Int. Cl.³ ............................................. G11B 23/02
[52] U.S. Cl. .................................. 360/132; 242/199
[58] Field of Search ................. 360/132, 93, 85, 96.1, 360/128, 137; 242/199, 200

[56] References Cited

U.S. PATENT DOCUMENTS

| | | | |
|---|---|---|---|
| 3,900,170 | 8/1975 | Serizawa | 360/132 |
| 4,021,006 | 5/1977 | Morimoto et al. | 242/199 |
| 4,173,319 | 11/1979 | Umeda | 242/199 |
| 4,235,395 | 11/1980 | Wardenaar et al. | 360/132 |

Primary Examiner—Alfred H. Eddleman
Attorney, Agent, or Firm—Lewis H. Eslinger; Alvin Sinderbrand

[57] ABSTRACT

A tape cassette comprises a housing of generally rectangular configuration containing reels on which a supply of tape is wound and having top and bottom walls and a peripheral wall extending between the top and bottom walls along three sides of the housing so as to form an opening along the fourth side of the housing, the top and bottom walls having first and second cutouts communicating with the opening and extending along a portion of said fourth side of the housing, respectively, the tape being guided between the reels in a path having a run extending along the opening, a front lid mounted on the housing and being movable relative thereto between a closed position covering the opening and an opened position exposing the opening and a back lid movable in connection with the movement of the front lid between the closed position wherein the back lid is positioned behind the front lid and the opened position wherein the back lid is taken away from the back side of the tape so that the run of the tape and be engaged through the second cutout for withdrawal of the tape through the opening, and the back lid having a lid portion which closes the first cutout in the closed position so that the run of the tape is enclosed only by the front and back lids, whereby the adhesion of dust to the tape and the damage of the tape can be prevented.

8 Claims, 6 Drawing Figures

TAPE CASSETTE

BACKGROUND OF THE INVENTION

I. Field of the Invention

This invention relates to a tape cassette and in particular, is directed to such tape cassette which is preferably used in a recording/reproducing apparatus as video tape recorders, various other information processors and the like.

II. Description of the Prior Art

A tape cassette which is used in conventional video tape recorder (which is hereinafter referred as VTR) is provided with an opening formed along one side of cassette housing and a cutout communicating with the opening and which is formed in bottom wall of the housing. When the tape cassette is loaded in a cassette holder of the VTR, tape loading pins mounted on a loading ring are inserted into the cutout of the cassette housing. Upon rotation of the loading ring, the tape loading pins withdraw the tape from the cassette housing to wrap the tape around peripheral surface of guide drum of the VTR.

Such a tape cassette is usually provided with a lid which is movably mounted on the housing between a closed position covering the opening of the housing and an opened position exposing the opening thereof, whereby the tape is prevented from being accidentally damaged. Needless to say, when the cassette is loaded in the cassette holder, the lid is moved from the closed position to the opened position in order to enable a withdrawal of the tape through the opening.

However, the above-mentioned type of the tape cassette has a disadvantage that the dust or the like is apt to adhere on surface of the tape or the back of the tape can be inadvertently touched, because the back side of the tape is exposed through the cutout even in the closed position. As a result, it causes a drop-out in recording and reproducing the tape.

SUMMARY OF THE INVENTION

One object of the present invention is to provide an improved tape cassette which overcomes the above-described disadvantage.

Another object of the present invention is to provide the tape cassette in which the tape passing along an opening of the cassette is completely enclosed in such condition that the cassette is not in use.

In accordance with the present invention a tape cassette comprises a housing containing reels on which a supply of tape is wound and having first and second walls. The housing has an opening along one side and a cutout extending through the walls and communicating with the opening along a portion of the opening, the tape being guided between the reels in a path extending along the opening. A front cover is mounted on the housing for movement relative thereto between a closed position for covering the opening in front of the tape and an opened position for exposing the opening and the front of the tape. The front cover has an edge proximate to and spaced from an edge of the first wall of the housing at the cutout when the front cover is in the closed position. An inner cover is movable with the front cover and is positioned behind the tape to enclose the tape between the inner cover and the front cover when the front cover is in the closed position. The back of the tape is exposed when the front cover is in the opened position so that the tape can be engaged through the cutout at the second wall for withdrawal of the tape through the opening. The inner cover has a lid portion rigidly secured thereto for spanning the edges of the front cover and the first wall of the housing to cover the cutout at the first wall when the cover is in the closed position.

The above and other objects, features and advantages of the invention, will be apparent in the following detailed description of illustrative embodiments of the invention which is to be read in connection with the accompanying drawings wherein the same reference numerals are used to identify the same parts in the several views.

BRIEF DESCRIPTION OF THE DRAWINGS

The accompanying drawings illustrate an embodiment of the present invention applied to a tape cassette for a video tape recorder, in which.

DETAILED DESCRIPTION OF THE PREFERRED EMBODIMENT

An embodiment of the present invention applied to a tape cassette for a video tape recorder will be described hereinafter with reference to the accompanying drawings.

Figure 1:
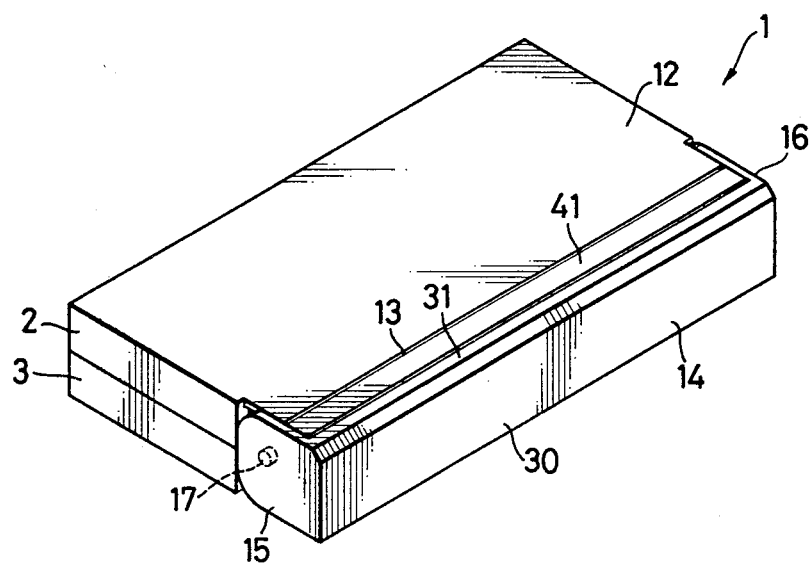
FIG. 1 is a perspective view showing the appearance of the tape cassette.

Referring first to FIG. 1, there is shown a tape cassette 1 consisting of an upper half 2 and a lower half or first portion 3 both made of a synthetic resin. The upper half or second portion 2 and the lower half 3 are vertically fitted together to form a housing with top, or first, and, or second, bottom walls. The housing includes a peripheral wall. The first housing portion 2 includes the first side of the peripheral wall and the second housing portion 3 includes the second side of the peripheral wall. Within the housing, as shown in FIG. 2, is rotatably mounted a pair of tape reels 4 and 5, and a magnetic tape 6 (hereinafter referred to as the "tape") is wound around the tape reels 4 and 5.

Figure 2:
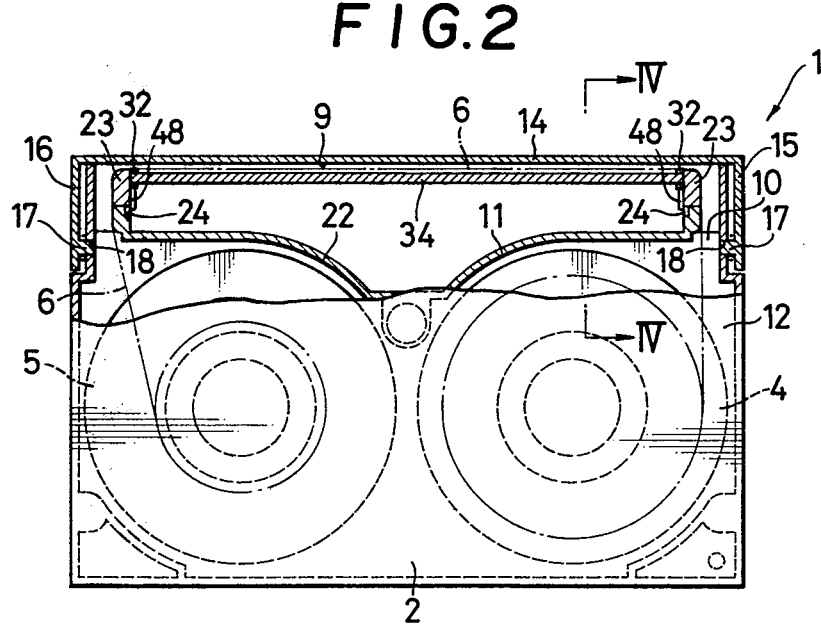
FIG. 2 is a plan view of the tape cassette with an upper portion thereof being partially cut away.
Figure 3:
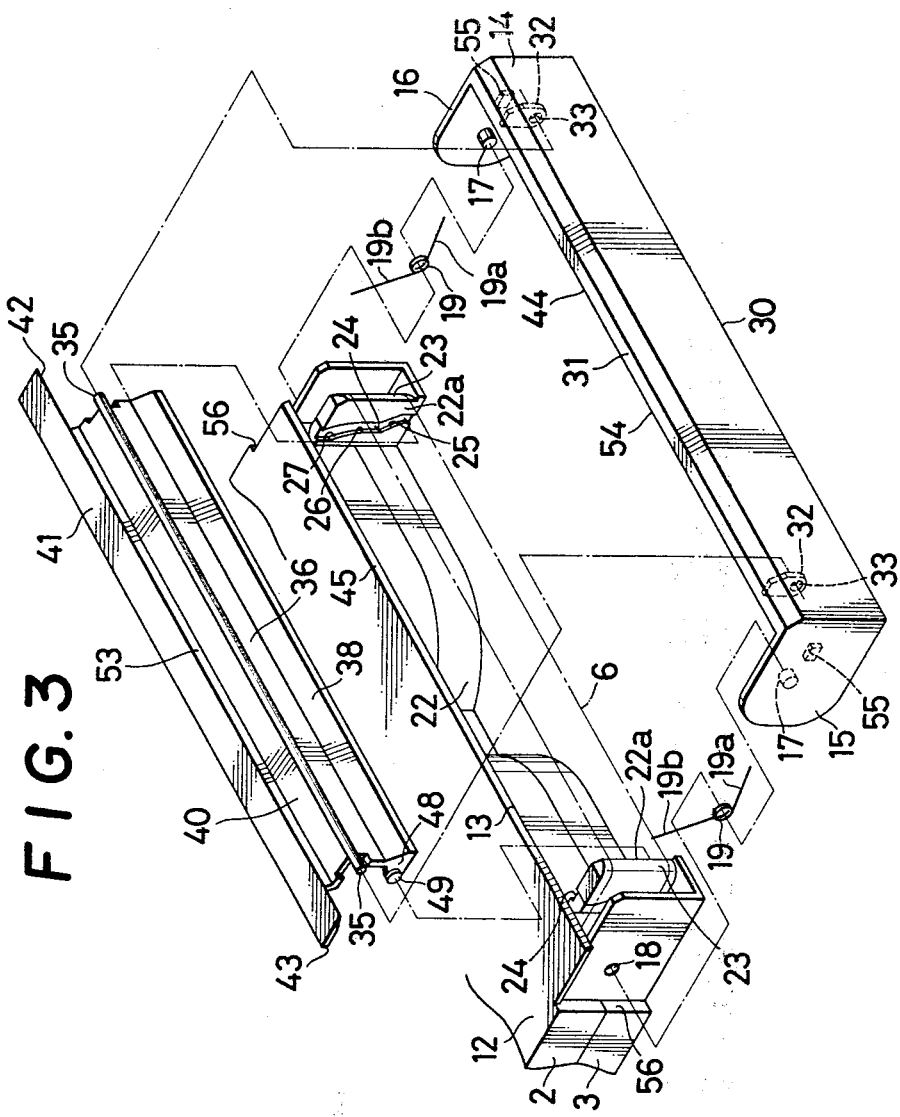
FIG. 3 is an exploded perspective view of the tape cassette.

In the front side of the tape cassette 1, as shown in FIGS. 2 and 3, an opening portion 9 is formed nearly throughout the full width of the cassette, while a substantially trapezoidal notched portion 11 contiguous to the opening portion 9 is formed in a lower partition 10 of the lower half 3. An upper notched portion 13 contiguous with the opening portion 9 is is formed in an upper partition 12, extending along the entire width of the cassette. The notched portions comprise a cutout extending between and through the first and second walls and along a portion of the opening.

The opening portion 9 is normally covered with a U-shaped front cover 14. The upper notched portion 13, or the cutout at the top wall, is normally closed by an upper cover or lid portion 41 integral an inner cover 34 to be described later. A pair of pivots 17 are integrally and coaxially formed at the insides of right and left end portions 15 and 16 of the front cover 14. The pivots 17 are respectively inserted through a pair of holes 18 formed at the right and left ends of the tape cassette 1. The front cover 14 swings vertically on the pair of pivots 17 within a range of about 90°. A pair of torsion springs 19 are mounted on the pair of pivots 17. Front and rear ends 19a and 19b of the torsion springs 19 are respectively supported by spring fixing projections 55 formed integrally to extend inward from both ends 15 and 16 of the front cover 14 and by spring holding steps 56 formed at each end of the tape cassette 1. The front cover 14 is constantly biased to the closing direction with these torsion springs 19. Described more in details, the pivots 17 are supported at positions slightly backward rather than at the normal positions in the conventional tape cassette. With this arrangement, the pivot locus of the front cover 14 may not overly extend in front of the tape cassette 1.

Along the trapezoidal notched portion 11 as shown in FIG. 3, a vertical partition 22 stands upright and joins to the vertical partition 22 projected from the upper partition 12, whereby the interior of the tape cassette 1 is partitioned from the notched portion 11 and the upper notched portion 13 by the vertical partition 22, which has two mutually facing inside portions 22a at the ends of the cutout.

Figure 4:
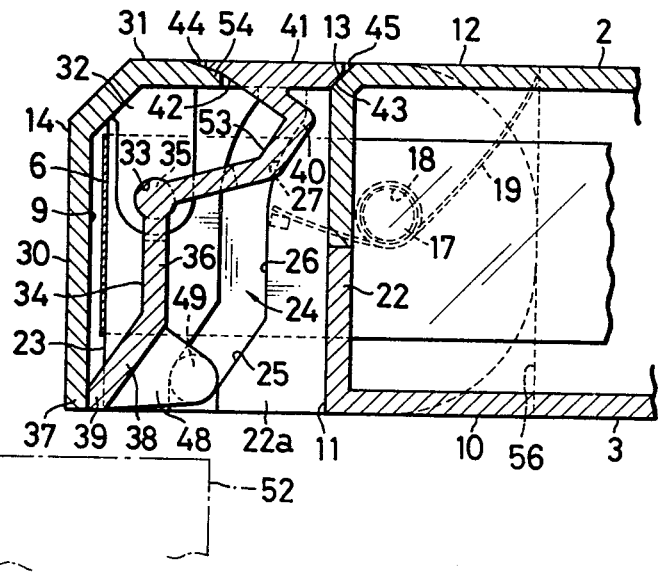
FIG. 4 is a partial sectional view taken on line IV—IV of FIG. 2.
Figure 5:
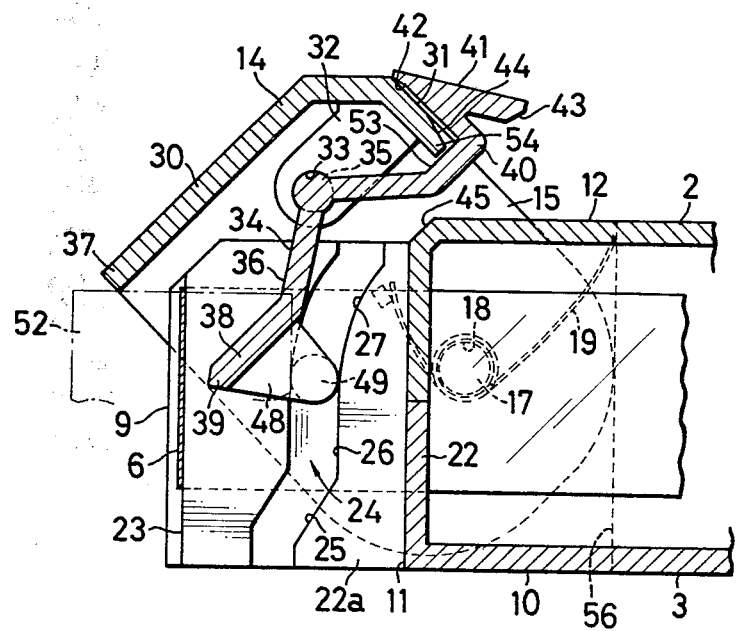
FIGS. 5 and 6 illustrate the front and inner covers of the tape cassette in operation of opening or closing.
Figure 6:
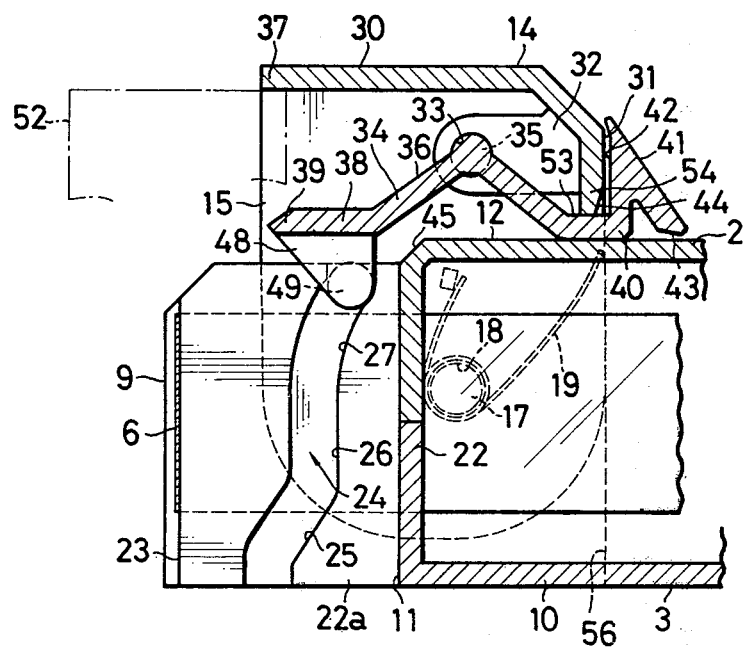

A pair of tape guide portions or surfaces 23, the surfaces of which are round and smooth, are formed at both right and left end inside portions of the vertical partition 22, whereby the tape 6 is guided and passed along the opening portion 9. Guide grooves 24 are formed to extend to the vertical direction in both right and left inside portions 22a of the vertical partition 22, thereby facing to each other at the side of the notched portion 11. These guide grooves 24 serve to guide a pair of guide pins 49 of the inner cover 34 to be described later. Each guide groove 24 comprises an inclined portion 25, a vertical portion 26 and a curved portion 27, as shown in FIGS. 4 to 6. The pair of guide grooves 24 are formed by combining of the upper and lower halves 2 and 3 so as to prevent undercutting in the molding process. In other words each inside portion 22a has a front wall part, which is integral with the first or top wall of the housing, and a rear wall part, which is integral with the second or bottom wall of the housing, and the guide grooves 24 are formed when these two wall parts are joined.

As shown in FIG. 3, the front cover 14 includes a front plate 30 and an upper plate 31 which cover the opening portion 9 and part of the upper notched portion 13, respectively. The upper plate 31 terminates at an edge that is spaced from the top wall of the housing when the front cover is in its closed position. A pair of brackets 32 are formed in the lower surface of the upper plate 31 at the positions in the vicinity of the both right and left end portions thereof. In the holes 33 disposed in the brackets 35 are respectively fitted the support pins 35, which are arranged integrally and coaxially almost at each central portion in the vertical direction of the right and left end portions of the inner cover 34. Therefore, this inner cover 34 can be swing on the pair of support pins.

The inner cover 34 extends from the support pins 35 to form an shallow angle with each other as shown in FIG. 4. The lower portion from the support pins 35 forms an opposing portion 36 extending parallel to the rear surface of the tape 6. The lower end or edge of the opposing portion 36 has an inclined portion 38 which is inclined toward a lower end or edge 37 of the front plate 30. A lower end 39 of the inclined portion 38 is normally in contact with the lower end 37 of the front plate 30. The upper portion of the support pins 35 forms a substantially U-shaped bent portion 40. The upper cover or lid portion 41 is integrally coupled to and depends from the upper ends of the bent portions 40. The upper cover portion 41 is normally coplanar with the upper plate 31 of the front cover 14 and the upper wall 12 of the upper half 2 so as to span the edge of the upper plate 31 and the cutout at the top wall portion and completely close the upper notched portion 13 or cutout. Thus, with the respective edges of the front and inner covers in contact, a tape enclosure is formed along the run of tape in the opening. More specifically, inclined surface portions 42 and 43 are formed at the front and rear ends of the upper cover portion 41. Inclined surface portions 44 and 45 are formed at the rear end of the upper plate 31 and at the edge of the upper notched portion 13, respectively. The inclined surface portions 42, 44, 43 and 45 are in tight contact with each other to close the upper notched portion 13.

As shown in FIGS. 2 to 6, a pair of brackets 48 are provided integrally at the rear surface of the inclined portion 38 of the inner cover 34, situated at the right and left end portions thereof. The guide pins 49, which are formed integrally and coaxially with each other, are attached to tip end portions of the pair of brackets 48 and project horizontally toward the outside, that is, to the right and left directions, respectively. The guide pins 49 are slidably inserted in the pair of guide grooves 24 formed in the inner surfaces 22a at the right and left ends of the vertical partition 22.

In the tape cassette 1 having the construction described above, normally the front surface of the tape 6 passed along the opening portion 9 is covered with the front cover 14 and its back is covered with the inner cover 34 as shown in FIG. 4. The upper notched portion 13 is completely sealed by the upper plate 31 of the front cover 14 and the upper cover portion 41 of the inner cover 34. Therefore, the tape 6 passed along the opening portion 9 is almost sealed by the front cover 14 and the inner cover 34, and there is no fear of the tape 6 being damaged. Thus, the tape cassette 1 of the present invention is very reliable.

When the tape cassette 1 is loaded onto the body of the video tape recorder, the front cover 14 and the inner cover 34 pivot upward, whereby the front and the back of the tape 6 are opened. At the same time, a tape loading guide (not shown) is inserted through the notched portion 11 to allow loading of the tape 6. For example, the tape cassette 1 being inserted into a cassette holder or the like disposed in the video tape recorder, and then being moved downward in FIG. 4 to be loaded in the cassette loading position, one of the end portions 15 and 16 of the front cover 14 is pushed up by a projection 52 formed in the cassette loading position, so that the front cover 14 is opened and pivots upward against the torsion springs 19. Meanwhile, the guide pins 49 of the inner cover 34 move upward by being guided by the pair of guide groove 24. Therefore, the inner cover 34 is opened while being guided by the pair of guide grooves 24. More specifically, in the initial period of cover opening operation, the pair of pins 49 are guided by the pair of inclined portions 25 to be moved upward and backward. Therefore, the inner cover 34 pivots counterclockwise upon the support pins 35, and the lower ends 39 of the inner cover 34 rapidly move behind the tape 6. Then, a large space is formed between the lower end 37 of the front cover 14 and the lower end 39 of the inner cover 34. Even if the tape 6 is slightly slackened, it may not be damaged by being urged against the front cover 14 or the inner cover 34.

In the intermediate period of the cover opening operation, as shown in FIG. 5, the pair of pins 49 move vertically upward by being guided by the pair of vertical portions 26. Then, the lower end 39 of the inner cover 34 moves vertically upward at a sufficient distance from the rear surface of the tape 6. On the other hand, since the pivots 17 of the front cover 14 are arranged at relatively withdrawn positions, the lower end 37 of the front cover 14 does not overly project at the front side of the tape cassette 1. Accordingly, the space factor at the front side of the cassette tape 1 under the loaded mode, may be improved on conventional cassettes, so that VTRs may be made more compact in size. A recess 53 is formed inwardly in each bent portion 40 of the inner cover 34. When the front cover 14 and the inner cover 34 open, as shown in FIGS. 5 and 6, a distal end 54 of the upper plate 31 of the front cover 14 can be smoothly inserted into this recess 53. Therefore, the cover opening operation of the inner cover 34 may be performed in the ideal and optimal condition.

In the terminal period of the cover opening operation, as shown in FIG. 6, the pair of pins 49 move upward by being guided by the pair of curved portions 27. The lower end 39 of the inner cover 34 moves upward and backward, to bring it to the outside of the upper notched 13, and then the upper notched portion 13 is completely opened. Thus, the space of the vertical direction between the tape 6 and the vertical partition 22 is relatively great. Therefore, the tape loading guide, for example, may be deeply inserted inside the notched portion 11, so that the tape 6 may be correctly loaded and the tape cassette 11 may be made thin.

A description has been made on the cover opening operation of the front cover 14 and the inner cover 34 when the tape cassette 1 is loaded in the cassette loading position inside a VTR. In the case of the tape cassette 1 being removed from the video tape recorder, the cover closing operation of the front cover 14 and the inner cover 34, is completely in the reverse order of the above-mentioned case.

An embodiment of the present invention has been described above, but the invention is not limited to the above-exemplified construction, and various modifications may be made. For example, in the above embodiment, a pair of torsion springs 19 are respectively mounted on the pair of pivots 17 of the front cover 14. However, since the front cover 14 and the inner cover 34 are interlocked, the torsion spring 19 is enough only to be mounted on either of the front cover 14 and the inner cover 34. In addition, the torsion spring 19 need not always be provided right and left in a pair, but it is enough if it's provided at least on either of both sides. And that is very useful for facilitating the design of tape cassette 1.

Furthermore, the present invention is not limited to tape cassettes for VTRs but may be applied to tape cassettes of other various types of information processing devices.

As has been described earlier, the tape passed along the opening portion is almost completely sealed with a minimum number of parts consisting of two covers (front cover and inner cover). Therefore, the number of parts and assembly steps involved are small, and the structure is simple. Still, the tape cassette of the present invention does not allow dust or the like to adhere to the tape, or the tape to get damaged by other causes. Furthermore, the upper notched portion is formed in the upper surface of the tape cassette and the upper cover to close this upper notched portion is opened together with the inner cover. Therefore, the space from the inside of the notched portion to the back side of the tape is widened in amount of the upper notched portion, and thus, the insertion of the tape loading guide or the like may be ideally performed.

Although an illustrative embodiment of the invention has been described in detail herein with reference to the accompanying drawings, it is to be understood that the invention is not limited to that precise embodiment and that various changes and modifications may be effected therein by one skilled in the art without departing from the scope or spirit of the invention as defined in the appended claims.

The inner cover is pivotally supported to the front cover, the front cover and the inner cover are opened/closed in cooperation with each other, and the upper cover is formed integrally with the inner cover. Therefore, only opening one of the front cover and the inner cover results in opening both covers. For this reason, the biasing means (torsion springs) for closing the front cover and the inner cover, the projections arranged at the cassette loading positions and the like may be reduced to the minimum in number, so that the tape cassette and the cassette loader may be simplified in structure very much.

What is claimed is:

1. A tape cassette comprising:
   a housing containing reels on which a supply of tape is wound and having first and second walls, an opening along one side of the housing and a cutout extending through said first and second walls and communicating with said opening along a portion of said opening, wherein said tape is guided between said reels in a path extending along said opening;
   a front cover mounted on said housing and movable relative thereto between a closed position for covering said opening in front of said tape and an opened position for exposing said opening and the front of said tape, wherein an edge of said front cover, when said front cover is in said closed position, is disposed proximate to and spaced from an edge of said first wall of said housing at said cutout; and
   an inner cover movable with said front cover wherein said inner cover is positioned behind said tape to enclose said tape between said inner cover and said front cover when said front cover is in said closed position and the back of said tape is exposed when said front cover is in said opened position so that said tape can be engaged through said cutout at said second wall for withdrawal of the tape through said opening, said inner cover having a lid portion rigidly secured thereto for spanning said edges of said front cover and said first wall of said housing to cover said cutout at said first wall when said front cover is in said closed position.

2. A tape cassette according to claim 1, wherein said inner cover is hinged on said front cover for movement as said front cover moves between said closed position and said opened position.

3. A tape cassette according to claim 2, wherein said inner cover has a guide pin on one end thereof and said housing includes a guide groove having said guide pin disposed therein for guiding the movement of said inner cover as said front cover moves between said closed position and said opened position.

4. A tape cassette according to claim 3, wherein said housing comprises a first portion including said first wall and a first side of a peripheral wall extending around and enclosing said housing and a second portion including said second wall and a second side of said peripheral wall, said inner cover extends the length of said cutout and has one of said guide pins at each end thereof, said peripheral wall has two mutually facing inside portions at the ends of said cutout, and said inside portions each have a guide groove therein.

5. A tape cassette according to claim 4, wherein each said inside portion of said peripheral wall comprises a front wall part integral with said first wall and a back wall part integral with said second wall and said guide grooves are formed between said front wall part and said back wall part.

6. A tape cassette according to claim 5, wherein said front wall parts have tape guiding surfaces at the front edges thereof to guide said tape along said opening.

7. A tape cassette according to claim 1, wherein said lid portion is integral with said inner cover.

8. A tape cassette according to claim 7, wherein:

said front cover has another edge proximate to and spaced from the edge of said second wall of said housing at said cutout when said front cover is in said closed position;

said inner cover has a first edge for contacting said first-mentioned edge of said front cover and a second edge for contacting said other edge of said front cover to form a tape enclosure along said tape path when said front cover is in said closed position; and said lid portion depends from said first edge of said inner cover.

* * * * *